United States Patent [19]

Goldberg et al.

[11] Patent Number: 5,134,605
[45] Date of Patent: Jul. 28, 1992

[54] OPTICALLY READABLE MEDIA UTILIZING SCANNING TUNNELING MICROSCOPE FOR EXCITATION

[75] Inventors: Harris A. Goldberg, Colonia, N.J.; Ronald G. Reifenberger, Tippecanoe, Ind.

[73] Assignee: Hoechst Celanese Corp., Somerville, N.J.

[21] Appl. No.: 750,429

[22] Filed: Aug. 20, 1991

Related U.S. Application Data

[63] Continuation of Ser. No. 400,842, Aug. 30, 1989, abandoned.

[51] Int. Cl.$^5$ ................................................ G11B 9/10
[52] U.S. Cl. ...................................... 369/101; 369/126; 365/118; 365/151
[58] Field of Search ............ 369/100, 101, 126, 275.1; 365/118, 151

[56] References Cited

U.S. PATENT DOCUMENTS

| | | | |
|---|---|---|---|
| 4,343,993 | 8/1982 | Binnig | 250/306 X |
| 4,678,736 | 7/1987 | Hanamura | 369/275.1 X |
| 4,719,613 | 1/1988 | Hirose | 369/275.1 X |
| 4,826,732 | 5/1989 | Kazan | 369/126 X |
| 4,829,507 | 5/1989 | Kazan | 369/126 X |
| 4,837,435 | 6/1989 | Sakuhara | 250/307 X |
| 4,907,195 | 3/1990 | Kazan | 250/306 X |
| 4,916,688 | 4/1990 | Foster | 369/126 X |
| 4,945,515 | 7/1990 | Ooumi et al. | 369/126 |
| 4,950,638 | 8/1990 | Yuyama | 503/226 X |
| 4,962,480 | 10/1990 | Ooumi et al. | 369/126 |

FOREIGN PATENT DOCUMENTS

| | | |
|---|---|---|
| 0164577 | 12/1985 | European Pat. Off. . |
| 0212705 | 3/1987 | European Pat. Off. . |
| 0305033 | 3/1989 | European Pat. Off. . |

OTHER PUBLICATIONS

Patent Abstract of Japan, vol. 6, No. 237 (P-157)(1115) Nov. 25, 1982, of JP-A-57-135445, Aug. 21, 1982.
Research Disclosure 28130, Sep. 1987, Hampshire, England, p. 548, "Data Storage System".

*Primary Examiner*—Donald McElheny, Jr.
*Attorney, Agent, or Firm*—P. S. Kalyanaraman

[57] ABSTRACT

Provided is a method for reading information recorded in an information layer comprised of a fluorescent dye. In order to read the recorded information, the tip of a scanning tunneling microscope is passed over the information layer, said scanning tunneling microscope being of sufficient voltage to excite the fluorescent dye material to an excited state. Upon return of the dye material to ground state, fluorescence results. By measuring the fluorescence, or absence thereof, the recorded information can be deciphered.

2 Claims, 1 Drawing Sheet

OPTICAL MEMORY SYSTEM

OPTICALLY READABLE MEDIA UTILIZING SCANNING TUNNELING MICROSCOPE FOR EXCITATION

This application is a continuation of pending application SCANNING TUNNELING MICROSCOPE MEMORY UTILIZING OPTICAL FLUORESCENCE FOR READING, Ser. No. 07/400,842 filed Aug. 30, 1989, abandoned.

BACKGROUND OF THE INVENTION

The present invention relates to the reading of information recorded in an information medium. More specifically, the present invention relates to a method of reading information utilizing a scanning tunneling microscope in conjunction with an information layer comprised of a fluorescent material.

Scanning tunneling microscopy is a fairly recent development, with Gerd Binnig and Heinrich Rohrer having received the 1986 Nobel Prize in physics for its development. While the early designs of this microscope were both cumbersome and delicate, recent improvements have led to scanning tunneling microscope (STM) units which are both compact and robust.

An STM unit is generally comprised of a piezoelectric positioning device that is capable of rastering a sharp metallic tip with sub-nanometer resolution across a sample of interest. The piezoelectric positioner can take many shapes and is often comprised of a set of three orthogonal piezoelectric bars or a single piezoelectric tube which has been sectioned into four quadrants. In addition to moving the tip across the sample, the piezoelectric positioning device must also maintain a constant distance between the tip and sample. This feature of all STMs requires a very sensitive height detector.

In an STM, the height detector relies on the quantum mechanical nature of the tunneling current that flows between the tip and sample. In order to set up a tunneling current, the tip must be about 0.5 nm above the sample. It is well established that the tunneling current varies exponentially with distance such that a change in tip-to-sample distance of 0.1 nm causes about a factor of ten change in tunneling current. This exquisite sensitivity of the tunneling current to the tip-sample separation is used as a feedback signal to the piezoelectric positioner, thus allowing the tip-to-sample separation to be held constant to better than 0.01 nm.

A suitably designed STM unit can be quite small and STMs as small as one centimeter in diameter have been built. The piezoelectric positioner and tip assembly must be carefully isolated from vibrations and this is often accomplished by suspending the STM with spring-like supports. Often, two or three levels of vibration isolation are incorporated. However, by making the physical size of the instrument small and designing the piezoelectric positioner into a highly symmetric holder, the severe requirements on vibration isolation can be reduced to a manageable and easily achievable level.

The second requirement for a stable instrument is a high degree of temperature compensation. This is desirable because even a temperature gradient as small as 0.01K can cause unacceptably large drifts due to the uncontrolled thermal expansion of the piezoelectric positioner. Thus by carefully balancing the thermal expansion of the structural elements of the instrument against the expansion properties of the piezoelectric material, a high degree of temperature compensation can be automatically achieved, resulting in a constant tip-to-sample distance even while operating in an ambient air environment.

Based on recent developments in the design of STM instruments, it is anticipated that smaller, more stable, and more compact scanning assemblies will be developed within the foreseeable future. These STMs will routinely allow experiments at a length scale unimaginable only a few years ago. Of considerable current interest is the ability of the STM to modify in a controlled way the properties of matter at the nanometer length scale. In fact, the physical principles underlying the STM have already provided a means to alter and fabricate structures at the atomic level. Further background and detail with regard to the development and operation of a scanning tunneling microscope is also found in the paper "Scanning Tunneling Microscopy—From Birth to Adolescence", by Gerd Binnig and Heinrich Rohrer, reprinted in *Rev. Mod. Phys.*, Volume 59, No. 3, Part I, July 1987.

Electron tunneling is the phenomenon that underlies the operation of the scanning tunneling microscope. An electron cloud generally occupies a space between the surface of the sample and the needle tip used in the microscope. The cloud is a consequence of the indeterminacy of the electron's location (a result of its wave-like properties). Because the electron is "smeared out", there is a probability that it can lie beyond the surface boundary of a conductor. The density of the electron cloud decreases exponentially with distance. A voltage-induced flow of electrons through the cloud is therefore extremely sensitive to the distance between the surface of the sample, and the scanning needle tip.

To scan the surface, the tip of the needle is pushed toward the sample until the electron clouds of each gently touch. The application of a voltage between the tip and the sample causes electrons to flow through a narrow channel in the electron clouds. This flow is called the tunneling current. A change in the distance between the scanning needle tip and the surface of the sample by an amount equal to the diameter of a single atom causes a tunneling current to change by a factor as much as 1,000. Thus, extremely precise measurements of the vertical positions of the atoms on the sample surface may be obtained.

Due to the extraordinary sensitivity of the scanning tunneling microscope, it has become an important tool in surface science and physics in general. Its primary use has been to obtain atomic-resolution images of surfaces. However, efforts have also been used to manipulate materials as well as image them. See, for example, "Molecular Manipulation Using a Tunneling Microscope", by J. S. Foster, J. E. Frommer and J. C. Arnett, *Nature*, Volume 331, Jan. 28, 1988, Page 324; and, "Atomic-Scale Engineering" by J. B. Pethica, *Nature*, Volume 331, Jan. 28, 1988, Page 301.

A scanning tunneling microscope has also been applied in lithography. For example, lithography with a scanning tunneling microscope has been demonstrated by fabricating submicron lines using a "contamination process" and a Langmuir-Blodgett film as resists. Lithography using metal halide films and polymethylmethacrylate films have also been studied. For example, see McCord and Pease, *J. Vac. Sci. Technol.* B5(1), January/February 1987, Page 430 and *J. Vac. Sci. Technol.* B, Volume 6, No. 1, January/February 1988, Page 293; and, Y. Z. Li et al., *Appl. Phys. Lett., Vol.* 54, 1424 (1989).

The high resolution available through the application of a scanning tunneling microscope is certainly a most desirable attribute, and is indeed necessary if information were ever recorded at densities approaching from $10^{12}$ to $10^{14}$ bits/cm$^2$. The spatial resolution realized by use of the scanning tunneling microscope would certainly allow such high density information to be read efficiently and accurately. However, the present reading capabilities of a scanning tunneling microscope are too slow for any practical application in mass data storage. This inherent slowness of the device is due to the limited practical rate at which one could successfully modulate the voltage of the scanning tunneling microscope tip. If a method were found which could successfully utilize the resolution of a scanning tunneling microscope, without necessarily suffering from the inherent slowness in voltage modulation, a most impressive system would be obtained.

Accordingly, it is an object of the present invention to provide a method which employs a scanning tunneling microscope in the reading of information available on an information medium.

It is another object of the present invention to employ a novel method of reading information utilizing a scanning tunneling microscope which does not suffer from the inherent slowness of voltage modulation.

It is still a further object of the present invention to provide a method which permits the reading of information with high spatial resolution approaching information densities of from $10^{12}$ to $10^{14}$ bits/cm$^2$.

These and other objects of the present invention will become apparent upon a review of the following specification and the claims appended thereto.

SUMMARY OF THE INVENTION

In accordance with the foregoing objectives, there is provided by the present invention a novel method of reading the information contained in an information medium by utilizing a scanning tunneling microscope in conjunction with a fluorescent dye material. More specifically, the present invention comprises first providing an information medium having an information layer which is comprised of a fluorescent dye and which information layer contains a track of information bits. The tip of the scanning tunneling microscope is then passed over the information layer, said scanning tunneling microscope being of sufficient voltage to excite the fluorescent dye material to an excited state, whereby return of the dye material to ground state results in fluorescence. It is understood that in those regions of the material where information has been recorded, the fluorescent excited state has been elminated (or shifted to another value) so no fluorescence results. The recorded information is then deciphered by measuring the absence of the fluorescence signal.

In a preferred embodiment, the fluorescent material exhibits a first excited state and a second excited state, with excitation to the second excited state resulting in a chemical or physical change in the material, and with the first excited state being said excited state from which fluorescence can be observed. Upon passing the tip of the scanning tunneling microscope over the information layer, excitation of the fluorescent material to said first excited state is the result.

In another preferred embodiment of the present invention, the track of information bits is provided by employing a scanning tunneling microscope in the writing process, preferably in conjunction with light from a focused light source.

BRIEF DESCRIPTION OF DRAWING

The invention is described in detailed below in connection with the single FIGURE which is a schematic diagram of an optical memory system constructed in accordance with the present invention.

DETAILED DESCRIPTION OF THE PREFERRED EMBODIMENTS

Figure 1:
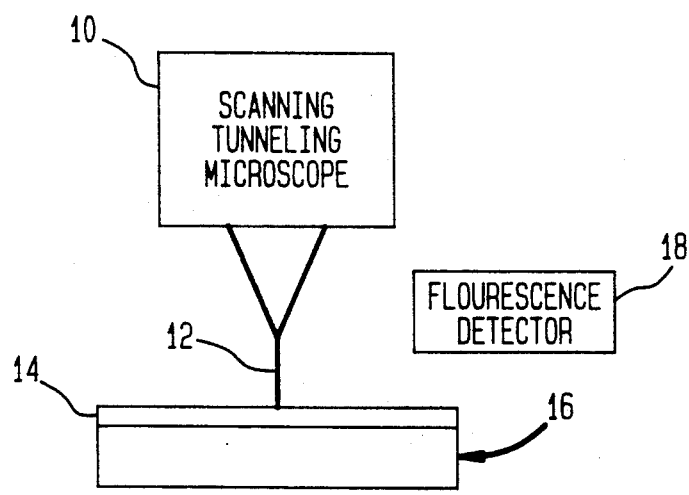

The present invention utilizes the combination of a scanning tunneling microscope with an information layer which contains a fluorescent dye material in reading the information contained in said information layer. By utilizing the unique resolution available from the scanning tunneling microscope, and the fluorescence of the dye material in order to read the information recorded in the information layer, a surprisingly accurate and efficient method is provided for reading highly densified information without suffering from the disadvantages of having to modulate the scanning tunneling microscope.

The scanning tunneling microscope 10 employed in the method of the present invention is the instrument developed by Gerd Binnig and Heinrich Rohrer, or any similar device. The tip of the needle 12 of the scanning tunneling microscope is pushed toward the information layer 14 until the electron clouds of each gently touch. The application of a voltage between the tip and the information medium causes electrons to flow through a narrow channel in the electron cloud. It is this flow which is the tunneling current. In the method of the present invention for reading the information contained in the information layer 14, the voltage applied is generally under ten volts, and is typically around one volt. The particular voltage, of course, will depend upon the particular constituency of the information layer 14, i.e., the particular type of fluorescent dye employed therein.

The application of the voltage is generally maintained at a constant level. Modulation of the voltage is preferably avoided to the extent possible. The real advantage of using the scanning tunneling microscope is its resolution, and hence its ability to read highly densified recorded information. The resolution available when using a diode laser is generally from 2,000 angstroms to 1 micron. By using the scanning tunneling microscope, a resolution ranging from 10 to 500 angstroms, and preferably from 10 to 100 angstroms (in linear length of the information bit) can be realized. Thus, the scanning tunneling microscope can accurately and efficiently read information recorded in a density ranging from $10^{12}$ to $10^{14}$ bits per square centimeter, i.e., 1000–100,000 gigabytes per square centimeter.

The information medium 16 employed has as its topmost layer the information layer 14. It is preferred that the information medium is of a disk format, and that the information track is of a circular nature, e.g., as in an optical disk. The information layer is comprised of a fluorescent dye material. Excitation of the fluorescent dye material to an excited state permits return of the dye material to the ground state with fluorescence. It is this fluorescence, measured by conventional means, which results in the reading of the information contained in the information medium. Preferably, it is the absence of a fluorescence signal which is noted as recorded information.

The fluorescent dye material is preferably an organic material. Of those organic materials which are most preferred, a naphthalocyanine compound is of particular interest. In a most preferred embodiment, such a fluorescent material exhibits a first excited state and a second excited state, with excitation to the second excited state resulting in a chemical or physical change in the material and with the first excited state being said excited state from which the fluorescence can be observed. Hence, during the writing process, excitation to the second excited state results in a chemical or physical change which is recognized as the recordation of a bit of information. A reading of the information takes place upon excitation of the remaining, unchanged fluorescent material to its first excited state upon passage of the tip of the scanning tunneling microscope over the information layer, with the resulting fluorescence upon return of the material to its ground state being measured.

In general, however, the dye material can be any of the well-known fluorescent dyes commercially available. For example, the fluorescent dye material can be a fluorescein, anilinenaphthalenesulfonic acid salt, nitrophenyl phosphate salt or rhodamine fluorescent dye material. Such dyes are commercially available, for example, from Eastman Kodak. Among such compounds are
fluorescein disodium salt
fluorescein isothiocyanate
fluorescein mercuric acetate
8-anilino-1-naphthalenesulfonic acid
8-anilino-1-naphthalenesulfonic acid ammonium salt
8-anilino-1-naphthalenesulfonic acid magnesium salt
thiofluorescein
6-p-toluidino-2-naphthalenesulfonic acid
rhodamine 123
rhodamine B
p-nitrophenyl phosphate bis (2-amino-2-ethyl-1,3-propanediol) salt
p-nitrophenyl phosphate tri buffer salt
2',7'-dichlorofluorescein
tetramethylrhodamine perchlorate
sulforhodamine B In the reading of the information, the tip of the scanning tunneling microscope is passed over the track of information bits, with the voltage applied being constant. The voltage must, however, be sufficient to excite the fluorescent dye in the information layer to its first excited state, from which fluorescence is observed upon return to the ground state. By applying a constant voltage to the scanning tunneling microscope, and relying upon the fluorescence of the dye material in the recording layer, the disadvantage of having to voltage modulate the scanning tunneling microscope is avoided. Rather, the scanning tunneling microscope can be quickly passed over the track of information bits, with the fluorescence being read by suitable and conventional equipment 18, as is well known to one skilled in the art.

The writing of the information in the information layer to thereby provide the track of information bits can be accomplished by irradiation of the information layer with light from the focused light source, as is conventional in the art of mass data storage. As well, the track of information bits can be achieved by employment of a scanning tunneling microscope. It is most preferred, however, that the information is recorded in the information layer by conjointly employing a scanning tunneling microscope operating in a constant voltage mode and a modulated, focused light source, as is described in co-pending, commonly assigned U.S. Ser. No. 400,841. When using the combination of the scanning tunneling microscope and modulated focused light source, it is most preferred that the fluorescent dye material exhibit two excited states, i.e., a first excited state and a second excited state, as discussed previously. Thus, writing can be accomplished by excitation of the fluorescent dye to the second excited state, whereas the first excited state can be used for the reading mode, since return from the first excited state to the ground state results in fluorescence.

It is most preferred that in writing the information in the information layer the bits of information are recorded by means of depleting the information layer of a fluorescent dye in controlled spots. Thus, the fluorescent dye will be present in the information layer only in those places where information has not been recorded. Thus, upon reading the information, a bit of information will appear, or be read, whenever a decrease in fluorescence is noted.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An optical information system incorporating a scanning tunneling microscope and an information media wherein said information media comprises an information layer formed of a fluorescing organic dye which has had its fluorescing capability de-activated in predetermined locations corresponding to data stored thereon and wherein said scanning tunneling microscope is operated in proximity to the information layer to selectively excite to a fluorescing state those portions of said layer which have not been de-activated.

2. The optical information system according to claim 1, wherein said information includes a dye selected from the group consisting of:
fluorescein disodium salt;
fluorescein isothiocyanate;
8-anilino-1-naphthalenesulfonic acid;
8-anilino-1-naphthalenesulfonic acid ammonium salt;
8-anilino-1-naphthalenesulfonic acid magnesium salt;
thiofluorescein;
6-p-toluidino-2-naphthalenesulfonic acid;
rhodamine 123;
rhodamine B;
p-nitrophenyl phosphate bis (2-amino-2-ethyl-1,3-propanediol) salt;
p-nitrphenyl phosphate bis (2-amino-2-ethyl-1,3-propanediol) salt;
p-nitrophenyl phosphate tri buffer salt;
2', 7'-dichlorofluorescein;
tetramethylrhodamine perchlorate; and
sulforhodamine B;

* * * * *